United States Patent
Froggatt et al.

(10) Patent No.: US 11,016,316 B2
(45) Date of Patent: May 25, 2021

(54) POLARIZATION CONTROL WITH LOW POLARIZATION-MODE DISPERSION

(71) Applicant: Intuitive Surgical Operations, Inc., Sunnyvale, CA (US)

(72) Inventors: Mark E. Froggatt, Blacksburg, VA (US); Eric E. Sanborn, Blacksburg, VA (US)

(73) Assignee: Intuitive Surgical Operations, Inc., Sunnyvale, CA (US)

( * ) Notice: Subject to any disclaimer, the term of this patent is extended or adjusted under 35 U.S.C. 154(b) by 0 days.

(21) Appl. No.: 16/348,495

(22) PCT Filed: Oct. 25, 2017

(86) PCT No.: PCT/US2017/058333
§ 371 (c)(1),
(2) Date: May 8, 2019

(87) PCT Pub. No.: WO2018/089198
PCT Pub. Date: May 17, 2018

(65) Prior Publication Data
US 2020/0057321 A1    Feb. 20, 2020

Related U.S. Application Data

(60) Provisional application No. 62/420,243, filed on Nov. 10, 2016.

(51) Int. Cl.
*G02B 6/10* (2006.01)
*G02F 1/035* (2006.01)
(Continued)

(52) U.S. Cl.
CPC ......... *G02F 1/0353* (2013.01); *G02B 6/2766* (2013.01); *G02B 6/2786* (2013.01); *G01L 1/242* (2013.01)

(58) Field of Classification Search
CPC ............................ G02F 1/0353; G02B 6/2766
See application file for complete search history.

(56) References Cited

U.S. PATENT DOCUMENTS

| 4,389,090 A | 6/1983 | LeFevre |
| 4,615,582 A | 10/1986 | Lefevre et al. |
| (Continued) | | |

FOREIGN PATENT DOCUMENTS

| JP | S60117219 A | 6/1985 |
| JP | H02170117 A | 6/1990 |

OTHER PUBLICATIONS

International Search Report and Written Opinion for Application No. PCT/US2017/058333, dated Jan. 19, 2018, 14 pages.
(Continued)

*Primary Examiner* — Eric Wong
(74) *Attorney, Agent, or Firm* — Schwegman Lundberg & Woessner, P.A.

(57) ABSTRACT

Optical polarization control devices that include two pairs of squeezing plates oriented in mutually perpendicular directions are described. Compressive forces exerted by the two pairs of plates onto an optical fiber can be configured for low polarization mode dispersion. Various methods and systems in which the polarization control devices can be employed are also described.

16 Claims, 4 Drawing Sheets

(51) Int. Cl.
*G02B 6/27* (2006.01)
*G01L 1/24* (2006.01)

(56) References Cited

U.S. PATENT DOCUMENTS

| | | | |
|---|---|---|---|
| 4,733,938 A | 3/1988 | Lefevre et al. | |
| 4,735,506 A * | 4/1988 | Pavlath | G01C 19/726 356/464 |
| 4,753,507 A * | 6/1988 | DePaula | G02B 7/00 385/11 |
| 4,793,678 A | 12/1988 | Matsumoto et al. | |
| 4,943,132 A | 7/1990 | Huang | |
| 4,960,319 A | 10/1990 | Dankowych | |
| 4,988,169 A | 1/1991 | Walker | |
| 5,115,480 A | 5/1992 | Large | |
| 5,903,684 A * | 5/1999 | Payton | G02F 1/0136 385/1 |
| 6,384,956 B1 * | 5/2002 | Shieh | G02F 1/0136 359/256 |
| 6,480,637 B1 | 11/2002 | Yao | |
| 6,873,783 B1 * | 3/2005 | Yao | G02B 6/105 385/11 |
| 7,206,468 B2 | 4/2007 | Huang | |
| 7,772,541 B2 | 8/2010 | Froggatt et al. | |
| 7,781,724 B2 | 8/2010 | Childers et al. | |
| 8,400,620 B2 | 3/2013 | Froggatt et al. | |
| 8,531,655 B2 | 9/2013 | Klein et al. | |
| 8,773,650 B2 | 7/2014 | Froggatt et al. | |
| 2005/0185190 A1 * | 8/2005 | Law | G01B 9/02007 356/484 |
| 2006/0013523 A1 | 1/2006 | Childers et al. | |
| 2006/0067604 A1 * | 3/2006 | Bull | G02B 6/2713 385/11 |
| 2011/0310378 A1 | 12/2011 | Froggatt et al. | |
| 2012/0281205 A1 | 11/2012 | Askins | |
| 2013/0077151 A1 | 3/2013 | Yao et al. | |

OTHER PUBLICATIONS

Vertut, Jean and Phillipe Coiffet, Robot Technology: Teleoperation and Robotics Evolution and Development, English translation, Prentice-Hall, Inc., Inglewood Cliffs, NJ, USA 1986, vol. 3A, 332 pages.

Extended European Search Report for Application No. EP17869776.9 dated May 28, 2020, 15 pages.

* cited by examiner

FIG. 4

POLARIZATION CONTROL WITH LOW POLARIZATION-MODE DISPERSION

CLAIM OF PRIORITY

This application is a U.S. National Stage Filing under 35 U.S.C. 371 from International Application No. PCT/US2017/058333, filed on Oct. 25, 2017, and published as WO 2018/089198 A1 on May 17, 2018, which claims the benefit of priority of U.S. Provisional Patent Application No. 62/420,243, filed on Nov. 10, 2016, each of which is incorporated by reference herein in its entirety.

TECHNICAL FIELD

This disclosure relates to optical polarization control, and specifically to polarization controllers with low polarization-mode dispersion.

BACKGROUND

Many fiber-optic applications involve the control or modulation of the optical polarization of light. For example, in fiber-optic sensing systems, it can be useful to probe the optical fiber with two orthogonally polarized guided modes, often across a range of optical wavelengths. Commonly used approaches for actively adjusting the polarization of light in an optical fiber include the use of LeFevre loops and the compression (or "squeezing") of the fiber between two surfaces (e.g., of a pair of "squeezing plates"). Both approaches rely on birefringence, that is, a difference in the index of refraction between two polarization directions, which causes a (wavelength-dependent) differential phase delay between two respective polarization components of light in the two directions (i.e., a phase shift of one polarization component relative to the other). LeFevre loops are combinations of inherently birefringent wave plates (e.g., a quarter-wave plate, a half-wave plate, and a quarter-wave plate), and allow controlling the polarization state of light at the output by manipulating the relative rotational positions of the plates. Fiber compression between two surfaces induces birefringence between a polarization direction parallel to the direction of compression and a polarization direction perpendicular to the direction of compression, and enables tuning the differential phase delay by adjusting the compressive force.

Both LeFevre loops and squeezing plates suffer from their inherent inability to produce negative phase delays, which entails that the effect on the output polarization that a small negative phase delay on a given polarization component (e.g., −10°) would have can only be achieved by a corresponding large positive phase delay (e.g., 350°, or some other positive phase delay that differs from the desired −10° by an integer multiple of 360°). The additional differential phase delay between the polarization components increases the degree of the (inevitable) variation of polarization with the wavelength of the light. As a consequence, the wavelength range over which polarization relations can be sufficiently maintained is limited. With squeezing plates, the problem is often exacerbated by a large biasing force needed to properly clamp down on the fiber, which can introduce additional phase delays amounting to the equivalent of multiple wavelengths.

SUMMARY

Described herein are optical polarization control devices, and methods and systems employing same, that can achieve low polarization mode dispersion (i.e., a low differential phase delay between two polarization components) by using two pairs of squeezing plates oriented in mutually perpendicular directions: a first pair of squeezing plates is used to apply a compressive force on an optical fiber segment disposed therebetween in a first direction, thereby to impart a positive phase delay on light polarized in the first direction, and a second pair of squeezing plates is used to impart a compressive force on the optical fiber segment in a second direction perpendicular to the first direction, thereby to impart a positive phase delay—greater or smaller than that imparted by the first pair of plates—on light polarized in the second direction. By choosing the two compressive forces such that the phase delay caused by the second pair of squeezing plates is smaller than the phase delay caused by the first pair of squeezing plates, a negative relative phase delay can be imparted on the light in the second direction. Moreover, the first pair of plates can be used to compensate for, or "subtract out," the phase delay resulting from any undesired biasing force of the second pair of plates. Accordingly, the two squeezing plates can be used to minimize any undesired polarization mode dispersion by keeping the relative phase delay experienced by light polarized in the second direction within the range from −1800 to +1800, or, in some embodiments, within some specified smaller range (e.g., −60° to +600, or −45° to +45°).

The forces applied by the first and second pairs of squeezing plates may be adjusted via suitable manual or automatically controlled actuators, such as knobs or set screws, or electronically controlled piezoelectric transducers, for example. In accordance with various embodiments, a first polarization controller including the first pair of plates is operated as a static polarization controller, that is, apart from any adjustments made during calibration or initial deployment of the polarization control device, the force it applies is constant, whereas a second polarization controller including the second pair of plates is operated as a dynamic polarization controller, e.g., to modulate the applied force in the second direction and the resulting phase delay periodically, or make adjustments based on variable parameters of the larger system in which the polarization control device is used (such as, e.g., temperature or an amount of birefringence induced elsewhere in the system). In one particular embodiment, a polarization control device including static and dynamic controllers is used to switch between two discrete polarization states within a fiber-optic sensing system (e.g., a shape-sensing system including an interferometer coupled to a shape-sensing fiber and a polarization-diverse optical detector at the output of the interferometer). The system may include a tunable light source and control circuitry to cause temporally coordinated variations of a wavelength of the light coupled into the optical fiber and of the force applied by the dynamic polarization controller. The control circuitry may, for example, sweep the wavelength of the light source alternatingly in opposite directions, and cause the polarization state to switch only during transitions between sweeping directions.

Accordingly, one aspect relates to an optical polarization control device including an optical fiber segment and first and second polarization controllers. The first polarization controller includes a first pair of plates, a first portion of the optical fiber segment being disposed and compressible between the first pair of plates, and the first pair of plates to exert a first transverse compressive force on the optical fiber segment in a first direction. The second polarization controller includes a second pair of plates, a second portion of the optical fiber segment being disposed and compressible between the second pair of plates, and the second pair of plates to exert a variable second transverse compressive force on the optical fiber segment in a second direction substantially perpendicular to the first direction. The polarization control device may further include an electronically controlled actuator (e.g., including a piezoelectric transducer) configured to vary the second transverse compressive force. In some embodiments, the device includes an electronic circuit to control the actuator to vary the second transverse compressive force periodically, e.g., to switch the second transverse compressive force between two discrete values. In some embodiments, the first and second transverse compressive forces cause respective first and second phase delays on light polarized in the first and second directions, respectively, the second transverse compressive force is variable between minimum and maximum values corresponding to respective minimum and maximum values of the second phase delay, and the first and second transverse compressive forces are such that the first phase delay is (e.g., about mid-way) between the minimum and maximum values of the second phase delay. The difference between the maximum and minimum values of the second phase delay is, in some embodiments, no more than 180 degrees.

Another aspect relates to a fiber-optic sensing system including an optical fiber; a light source configured to couple light having two orthogonal polarizations into the optical fiber; a first polarization controller comprising a first pair of plates to compress a first portion of the optical fiber therebetween with a constant first transverse compressive force; a second polarization controller comprising a second pair of plates to compress a second portion of the optical fiber therebetween with a variable second transverse compressive force to be exerted in a direction substantially perpendicular to the first force; and control circuitry to cause temporally coordinated variations of a wavelength of the light coupled into the optical fiber and of the second transverse compressive force. The control circuitry may operate the second polarization controller to alternate between two discrete values of the second transverse compressive force. In some embodiments, the light source is tunable, the control circuitry is to operate the light source to alternate between wavelength sweeps in sweeping directions of increasing and decreasing wavelength, and to cause the second polarization controller to switch the second transverse compressive force only during transitions between sweeping directions. The system may further include at least one interferometer, coupled to the optical fiber, that includes a reference arm and a measurement arm coupled to one end of an optical sensing fiber, light being backscattered in the optical (e.g., shape-) sensing fiber and coupled back into the measurement arm; and a polarization-diverse optical detector measuring an interference pattern between the backscattered light exiting the measurement arm and light exiting the reference arm, the interference pattern being measured for two polarization states corresponding to the two values of the second transverse compressive force. In addition, the system may include a data processor to process electrical signals resulting from the measured interference pattern for the two polarization states to determine an orientation, temperature, and/or strain of the sensing fiber as a function of position along the fiber.

Yet another aspect relates to a method including coupling light having two orthogonal polarizations into an optical fiber; using a first polarization controller comprising a first pair of plates that compress a first portion of the optical fiber therebetween to exert a constant first transverse compressive force on the optical fiber in a first direction; and using a second polarization controller comprising a second pair of plates that compress a second portion of the optical fiber therebetween to exert a variable second transverse compressive force on the optical fiber in a second direction substantially perpendicular to the first direction. The second force may be caused to alternate between two discrete values. In some embodiments, the method further involves periodically sweeping a wavelength of the light coupled into the fiber, alternatingly in sweeping directions of increasing and decreasing wavelength, and switching between the two discrete values only during transitions between the sweeping directions. The second transverse compressive force may also be adjusted based on a change in temperature of the optical fiber to keep a phase delay onto light polarized in the second direction constant, and/or based on a relative phase delay between light polarized in the first and second directions introduced externally to the first and second polarization controllers to compensate for that relative phase delay.

BRIEF DESCRIPTION OF THE DRAWINGS

The foregoing will be more readily understood from the following description of various example embodiments, in particular, when taken in conjunction with the accompanying drawings, in which.

DETAILED DESCRIPTION

Figure 1A:
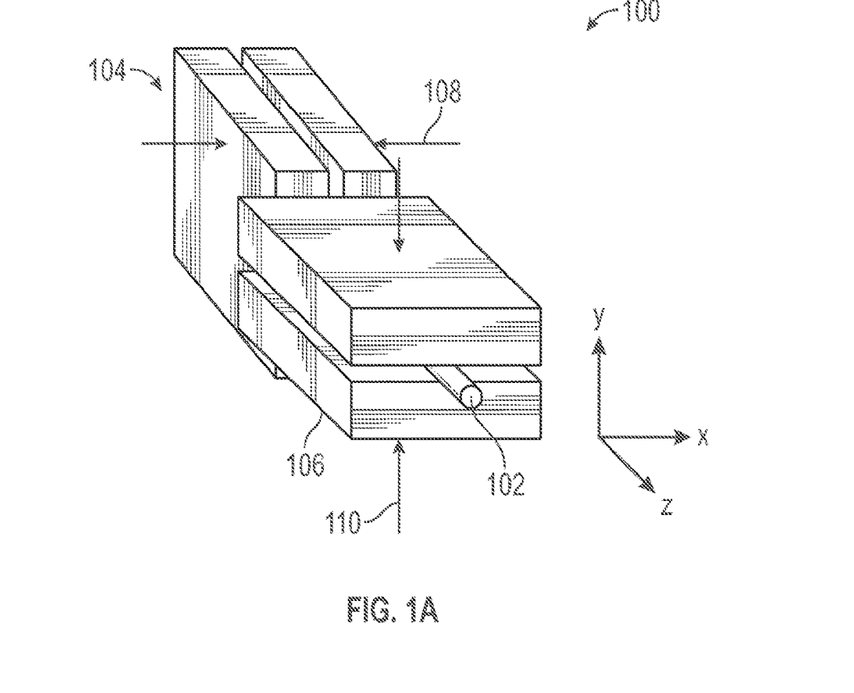
FIG. 1A schematically depicts a configuration of squeezing plates within a polarization control device in accordance with various embodiments.

FIG. 1A schematically depicts the plate configuration of a polarization control device 100 in accordance with various embodiments. The device 100 includes an optical fiber segment 102 disposed and compressible between two pairs of squeezing plates (herein also simply "plates") 104, 106. The squeezing plates may be planar, as depicted, or slightly rounded where the optical fiber enters and exits to provide a more gradual application of the compressive force along the squeezed fiber portion to prevent fiber fracturing. The pairs of squeezing plates 104, 106 are oriented to exert respective transverse compressive forces 108, 110 (i.e., forces perpendicular to the direction, or optical axis, of the fiber segment 102) onto (respective first and second portions of) the fiber segment 102, the forces 108, 110 being perpendicular to one another (or substantially perpendicular, e.g., in that the angle between them deviates from 90° by less than 5°, or preferably less than 1°). Denoting the direction of the optical axis of the fiber segment 102 as the z-direction in Cartesian coordinates, the forces are applied in the x- and y-directions.

Figure 1B:
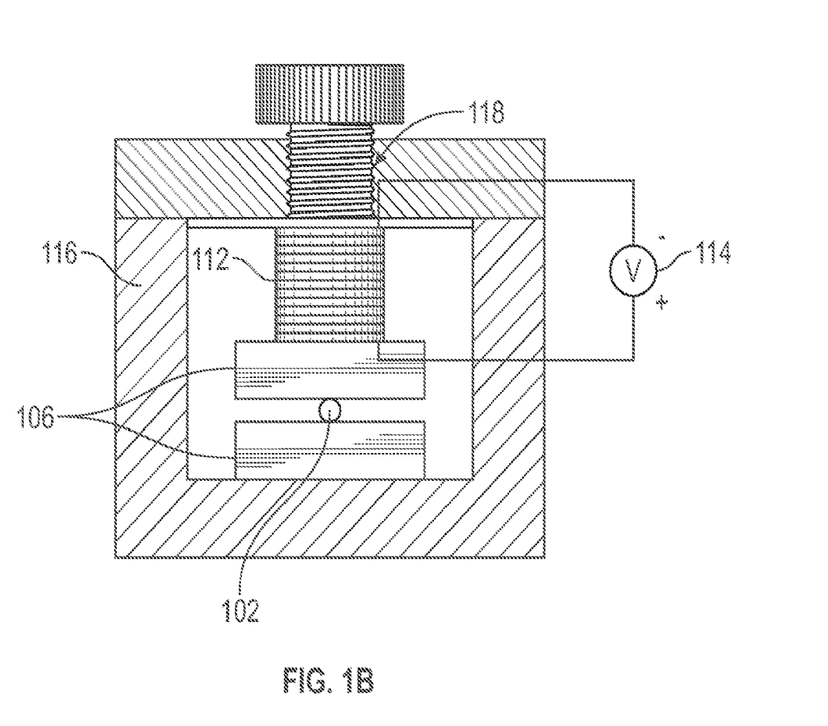
FIG. 1B depicts a pair of squeezing plates with an associated actuator, as may be used in a dynamic polarization controller in accordance with various embodiments.

FIG. 1B depicts, in a cross-sectional view through the device 100 and the optical fiber segment 102, a pair of squeezing plates 106 with an associated actuator (e.g., an electronically controlled actuator), as may be used in a dynamic polarization controller in accordance with various embodiments. In this example, the actuator is or includes a piezoelectric transducer 112, e.g., taking the form of a stack of disks made from a piezoelectric material. Application of a voltage 114 across the stack (often implemented by application, separately to each individual layer within the stack, of a voltage corresponding to the total voltage divided by the number of layers) causes the stack to expand or contract (depending on the polarity of the voltage), the dimensional change being proportional to the electric field generated across the stack and thus, for a given thickness, to the voltage. The piezoelectric transducer 112 is attached to one of the two plates, and the pair of plates 106 along with the piezoelectric transducer 112 are retained within a solid frame 116 such that, when the piezoelectric transducer 112 expands, it pushes the plate to which it is attached towards the other plate, causing the fiber segment 102 between the plates to be compressed. The transverse compressive force can be adjusted electronically via the voltage applied to the piezoelectric transducer 112, facilitating fast polarization modulation if desired. A suitable electronic circuit may, for example, control the actuator to periodically vary the transverse compressive force, e.g., switching it between two discrete values. The dynamic polarization controller may further include a set screw 118 that enables applying a preload, or biasing force, to the pair of squeezing plates 106 and the fiber segment 102 disposed therebetween. Such a set screw, or other adjustments enabled by screws or mechanisms, may also be used in a static polarization controller to adjust the static applied force, e.g., for the purpose of calibrating or deploying the polarization control device 100. Further, even a polarization controller lacking an electronically controlled actuator and including merely manual adjustment means (like a set screw) may be used, functionally, as a dynamic polarization controller in certain embodiments, e.g., where the induced differential phase delay serves to compensate for slowly varying polarization mode dispersion introduced elsewhere into the system.

Figure 2:
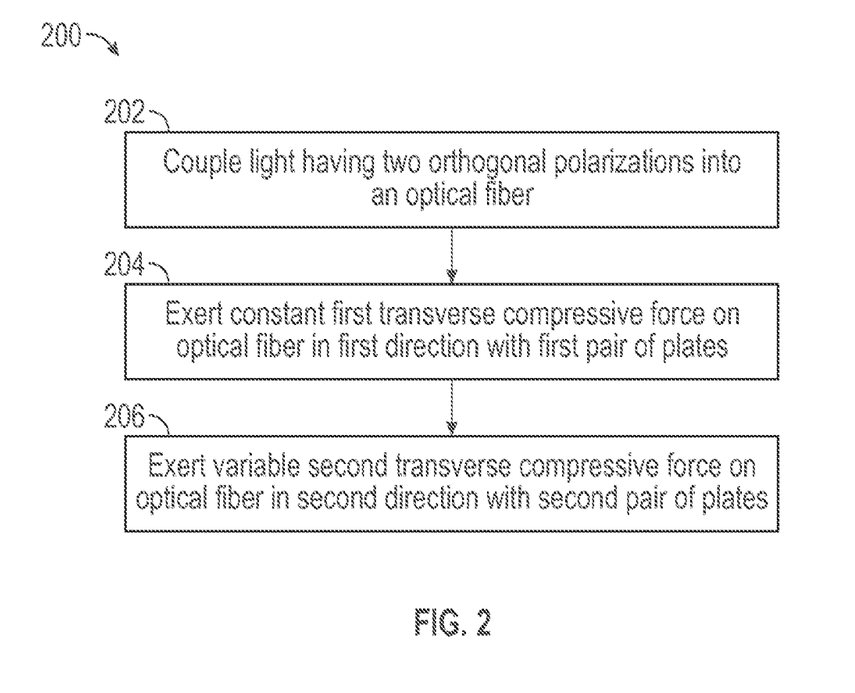
FIG. 2 is a flow chart illustrating a method of using polarization control devices with two mutually perpendicular pairs of squeezing plates, in accordance with various embodiments.

FIG. 2 is a flow chart illustrating a method 200 of using polarization control devices with two mutually perpendicular pairs of squeezing plates (e.g., as depicted in of FIG. 1A) in accordance with various embodiments. The method includes coupling light that has two orthogonal polarizations into an optical fiber (act 202); exerting a constant first transverse compressive force on the optical fiber in a first direction using a first pair of plates (of a first polarization controller, operated as a static polarization controller) that compress a first portion of the fiber therebetween (act 204); and exerting a variable second transverse compressive force on the optical fiber in a second direction substantially perpendicular to the first direction, using a second pair of plates (of a second polarization controller, operated as a dynamic polarization controller) that compress a second portion of the fiber therebetween (act 206). The various acts of the method 200 may be carried out simultaneously to achieve a desired relative phase delay between the two polarizations of the light coupled into the fiber.

Example applications of the device and method of FIGS. 1A-2 are hereinafter described.

Figure 3:
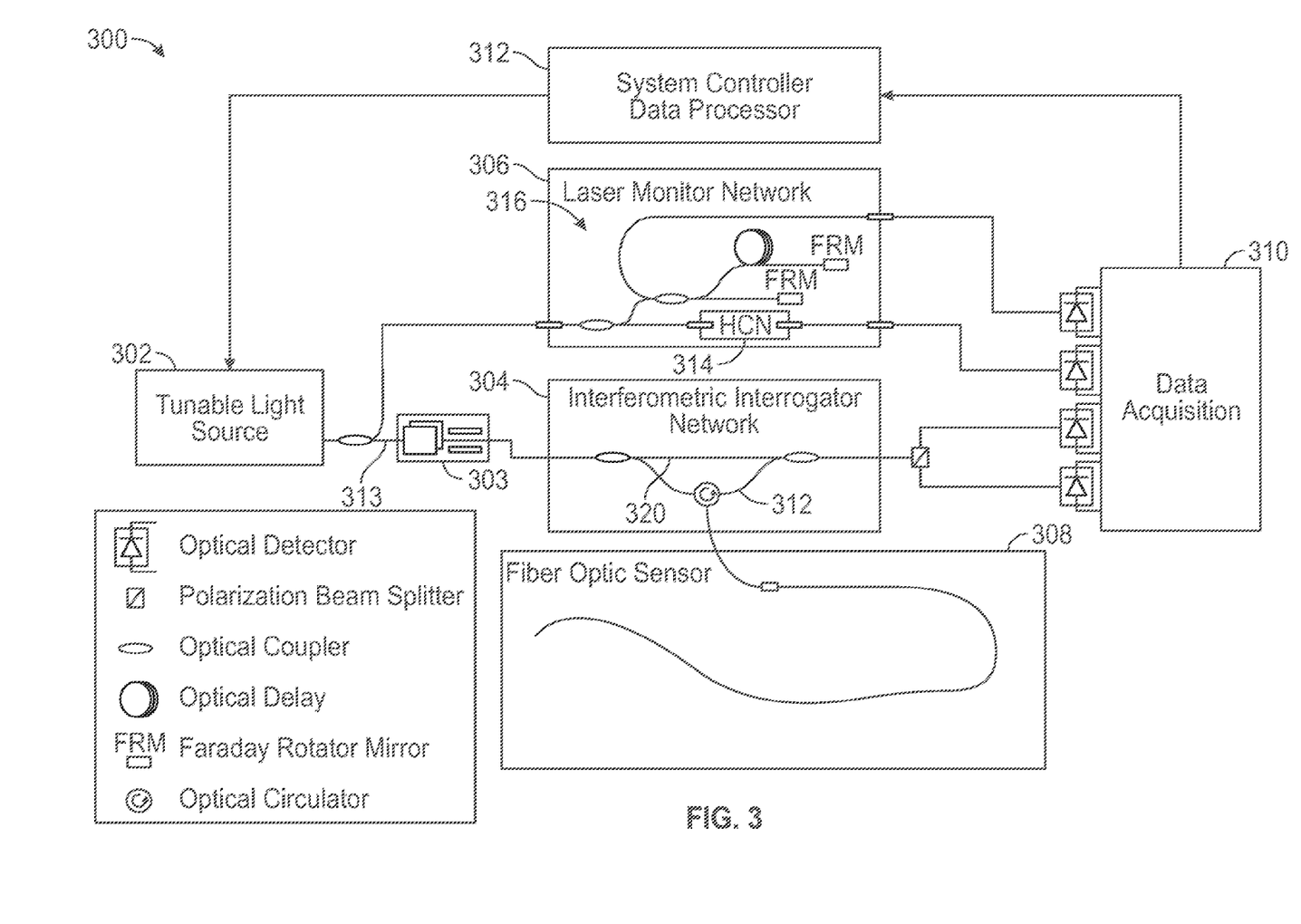
FIG. 3 is a block diagram illustrating an example fiber-optic sensing system in which a polarization control device in accordance with various embodiments may be used.

FIG. 3 illustrates an example fiber-optic sensing system 300 in which a polarization control device with static and dynamic polarization controllers may be used as a polarization modulator, in accordance with various embodiments. The system 300 is based on optical frequency-domain reflectometry (OFDR), and includes a tunable light source (usually a laser although other light sources may be used) 302, a polarization control device 303, an interferometric interrogator network 304, a laser monitor network 306, an optical sensing fiber 308, a data acquisition unit 310, and a computing system 312 acting as system controller and data processor (and thus also referred to as "data processor 312" herein). The optical sensing fiber 308 may be a single-core fiber or a multi-core fiber, depending on its use. Single-core fibers are suitable, e.g., for distributed temperature and strain sensing. For shape-sensing applications, a multi-core fiber including, for example, a center core (or waveguide) located about the central axis of the fiber and three or more outer cores (waveguides) arranged helically around the center core at a given radial distance therefrom may be used. Strain measurements taken along the length of each core, in conjunction with knowledge of the relative positions of the cores along the length of the shape-sensing fiber, can be combined to obtain a strain profile of the fiber (e.g., including measures of bend, twist, and axial strains), from which the three-dimensional position and orientation of the fiber may be reconstructed.

When an optical fiber is bent, the circular symmetry of the core is broken, and "vertical" and "horizontal" polarizations are created by the distinction between directions in the plane of the bend and perpendicular to the plane of the bend. Light traveling down the optical fiber then experiences different indices of refraction depending upon its polarization state, i.e., it undergoes birefringence. For fiber-optic sensing applications such as (but not limited to) shape sensing, this presents a significant problem because the measured phase change depends on the incident polarization state, and this incident state cannot be controlled in standard systems. The problem can be solved by measuring the optical core response at two orthogonal polarization states, e.g., as created with a polarization control device 303 as described herein. If the response of these two states is averaged properly, the variation in the measured response as a function of polarization can be eliminated or at least substantially reduced.

During an OFDR measurement, the light source 302 is swept through a range of wavelengths (or frequencies). Light emitted by the light source 302 is split with the use of optical couplers and routed to the laser monitor network 306 and the interferometric interrogator network 304. Light coupled into an optical fiber 313 that routes the light to the interferometric interrogator network 304 passes through the polarization control device 303. The polarization control device 303 includes first and second polarization controllers including respective first and second plates to exert a constant first transverse compressive force on a first portion of the optical fiber 313 and a variable second compressive force (substantially perpendicular to the first force) on a second portion of the optical fiber 313, respectively, and may be operated by control circuitry included in the system controller and data processor 312, optionally in conjunction with additional control circuitry integrated in the device 303 itself. Operation of the light source 302 and the polarization control device 303 may both be controlled, and thus coordinated with each other, by the system controller and data processor 312. Control circuitry within the system controller and data processor 312 may, for instance, operate the light source to alternate between wavelength sweeps in sweeping direction of increasing and decreasing wavelength, and cause the second polarization controller of the polarization control device 303 to switch between two discrete values of the second transverse compressive force, and thus switch the polarization state, during transitions between sweeping direction (that is, between successive wavelength sweeps in opposite directions.)

The laser monitor network 306 contains a Hydrogen Cyanide (HCN) gas cell 314 that provides an absolute wavelength reference throughout the measurement scan, and an interferometer 316 used to measure fluctuations in tuning rate as the light source is scanned through the wavelength range. The interferometric interrogator network 304 may include one or more interferometric interrogators, generally one for each waveguide in the optical sensing fiber 308. For simplicity of illustration, the depicted example system 300 is a single-channel system having only on interferometric interrogator, as used with a single-core sensing fiber 308. Light enters the sensing fiber 308 through the measurement arm 318 of the interferometric interrogator. Light backscattered in the optical sensing fiber 308, coupled back into the measurement arm 318, and exiting the measurement arm 318 is then interfered with light that has traveled along and is exiting the reference arm 320 of the interferometric interrogator. The interference pattern passes through an optical polarization beam splitter separating the in interference signal into two orthogonal polarization components, which are measured by two detectors (e.g., photodiodes) of the acquisition unit 310 (the two detectors collectively constituting a polarization-diverse optical detector). In multi-channel systems, the interferometric interrogator network includes multiple interferometers each coupled, in the measurement arm, to one of multiple respective waveguides of the optical sensing fiber (the pairing of one interferometer and the associated waveguide being referred to as an acquisition channel). Each of the interferometric interrogators is being coupled to the tunable light source 302 via optical couplers, and as the tunable light source 302 is swept, the interference patterns from all channels are simultaneously measured by respective polarization-diverse optical detectors, and processed independently. The distributed strain measurements recorded using a multi-channel OFDR system may then be exported for use or for further processing.

The optical detectors measuring the interference pattern(s) generated in the interferometric interrogator network 304, and additional detectors in the data acquisition unit 310 for measuring light signals from the gas cell 314 and interferometer 316 of the laser monitor network 306, convert the received light into electrical signals. The system controller and data processor 312 can process the electrical signals resulting from the measured interference pattern for the two polarization states to determine, e.g., the orientation, temperature, and/or strain of the sensing fiber as a function position along the fiber. In more detail, in some embodiments, the data acquisition unit 310 uses the information from the laser monitor network 306 to resample the detected interference pattern of the sensing fiber 308 to obtain samples at increments constant in optical frequency. Once resampled, the data is Fourier-transformed by the system controller and data processor 312 to produce a light scatter signal in the temporal domain. In the temporal domain, the amplitudes of the light scattering events are depicted verses delay along the length of the sensing fiber 308. Using the distance that light travels in a given increment of time, this delay can be converted to a measure of length along the sensing fiber 308. In other words, the light scatter signal indicates each scattering event as a function of position along the fiber; the sampling period is referred to as the spatial resolution and is inversely proportional to the frequency range that the tunable light source 302 was swept through during the measurement. As the sensing fiber 308 is, for example, strained, the local light scatters shift as the sensing fiber 308 changes in physical length. These distortions are highly repeatable. Hence, an OFDR measurement of detected light scatter for the sensing fiber 308 can be retained in memory to serve as a reference pattern of the sensing fiber in an unstrained state. A subsequently measured scatter signal when the sensing fiber 308 is under strain may then be compared to this reference pattern by the system controller and data processor 312 to obtain a measure of shift in delay of the local scatters along the length of the sensing fiber 308. This shift in delay manifests as a continuous, slowly varying optical phase signal when compared against the reference scatter pattern. The derivative of this optical phase signal is directly proportional to change in physical length of the sensing core of the fiber. Changes in physical length may be scaled to strain, producing a continuous measurement of strain along the sensing fiber 308.

Figure 4:
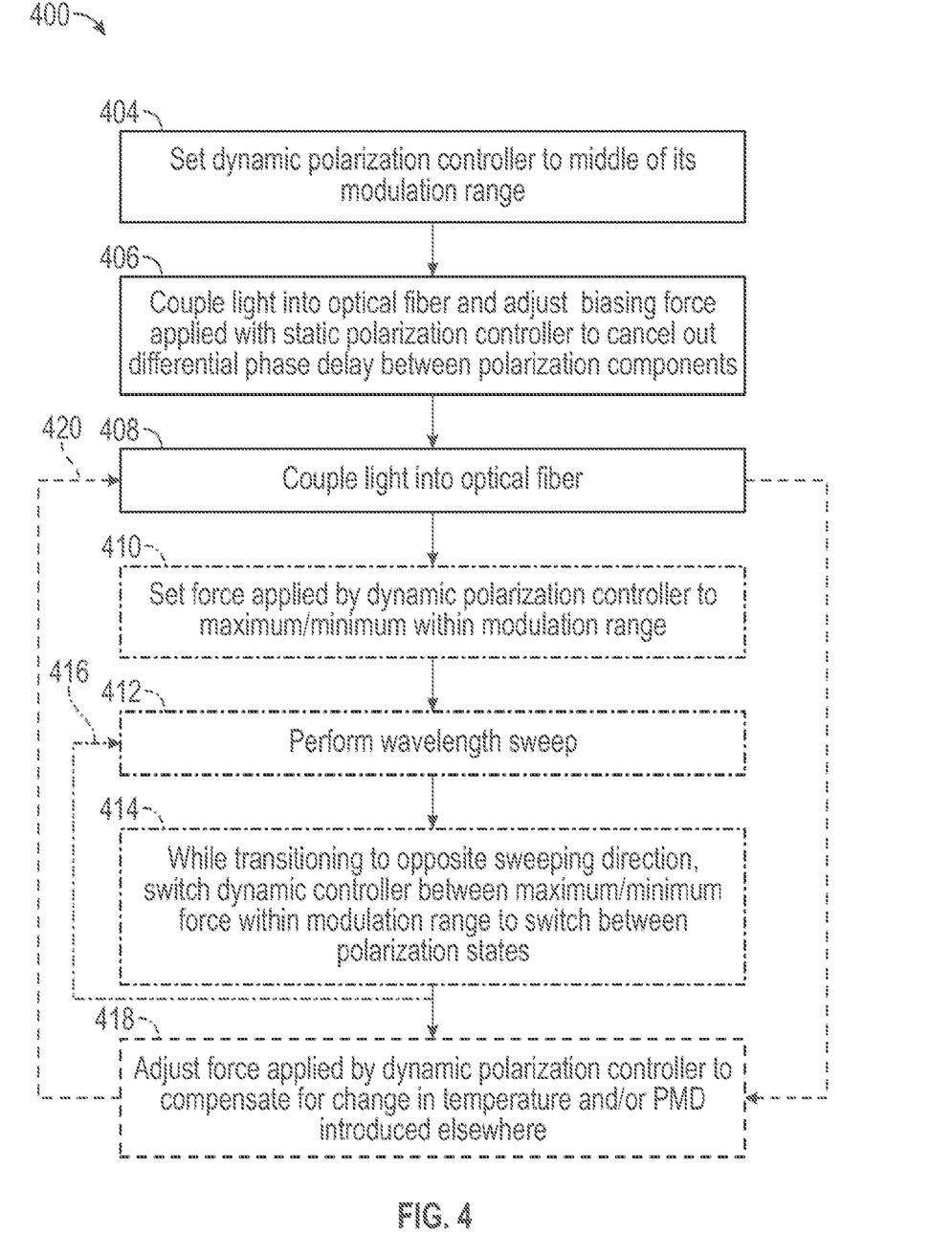
FIG. 4 is a flow chart illustrating a method of operating a polarization control device deployed within a fiber-optic system, in accordance with various embodiments.

FIG. 4 is a flow chart illustrating a method 400 of operating a polarization control device deployed within a fiber-optic system (such as, e.g., fiber-optic sensing system 300), in accordance with various embodiments. The installation of the polarization control device within the fiber-optic system may have been accomplished in various ways. For example, a pre-assembled polarization control device including an optical fiber segment disposed between static and dynamic polarization controllers (e.g., as shown in FIG. 1) may have been installed by splicing the optical fiber segment of the polarization control device with the optical fiber of the larger fiber-optic system. Alternatively, static and dynamic polarization controllers may have been assembled in place, e.g., by disposing pairs of squeezing plates about the optical fiber.

The method 400 involves configuring the polarization control device to minimize the polarization mode dispersion associated with subsequent use. For this purpose, the dynamic polarization controller may be set to the middle of its modulation range (act 304), which corresponds to the midpoint of the travel range of its actuator, and, in the case of a piezoelectric transducer, to half the maximum voltage (assuming that the actuator is on one end of its travel range if the applied voltage is zero). The biasing force applied with the static polarization controller can then be adjusted, once light is coupled into the optical fiber, to cancel out the differential phase delay between the two orthogonal polarizations, and thereafter be left constant (act 306). In this manner, the modulation range is configured symmetrically about the constant force applied by the static polarization controller, and the phase delay imparted by the static polarization controller on light polarized in the direction of its compressive force falls about mid-way between the maximum and minimum values of the phase delay imparted by the dynamic polarization controller on light polarized orthogonally thereto. (By "about mid-way" is meant herein that the phase delay imparted by the static polarization controller deviates by no more than 5% of the modulation range from the exact midpoint.) This allows for negative birefringence to be induced by the dynamic polarization controller, and minimizes the maximum possible magnitude of the differential phase delay between both polarizations for a given modulation range.

After the polarization control device has been configured, when light is coupled into the optical fiber during use of the fiber-optic system (at 308), the force applied by the dynamic polarization controller can be varied to achieve a desired variation in the polarization state of light exiting the polarization control device. In some embodiments, the force is varied between maximum and minimum values that result in a difference of no more than 1800 between the corresponding maximum and minimum values of the phase delay caused by the force. In general, the polarization may be varied continuously or in discrete steps. For example, in some embodiments, the polarization is switched back and forth between two discrete polarization states corresponding to the extrema of the modulation range by controlling the actuator of the dynamic polarization controller to switch the compressive force exerted by the dynamic polarization controller between two respective discrete values. In fiber-optic sensing applications involving wavelength sweeps, as described above with respect to FIG. 3, polarization switching may be confined to periods in which the light source transitions between sweeps in directions of increasing and decreasing wavelength, respectively. That is, for instance, as shown in FIG. 4, the force applied by the dynamic polarization controller may be initially set to either the minimum or the maximum of the modulation range (act 410), and following performance of a full wavelength sweep in one direction (act 412), the force of the dynamic polarization controller may be switched to the respective other extremum of the modulation range, whereby the polarization state is switched (act 414). Wavelength sweeps and polarization switching may be periodically repeated (in a modulation loop 416), e.g., at frequencies of tens or hundreds of Hertz. In this example embodiment, the rate of polarization switching equals the system update rate (measured in terms of the number of wavelength sweeps per second). In other embodiments, the polarization-switching rate may be reduced some integer fraction (e.g., one half) of the system update rate (such that the polarization switches only after a full sweep in both directions). More generally, the compressive force applied by the dynamic polarization controller may be temporally coordinated in some manner with the wavelength variation of the light. For instance, in some embodiments, the dynamic polarization controller gradually adjusts the applied compressive force during the wavelength sweep to compensate for any residual wavelength dependence of the induced differential phase delay. Furthermore, although only fiber-sensing systems that employ tunable light sources have been described herein in detail, it should be understood that polarization modulators as described may also be used in fiber-sensing applications that do not use tunable light sources, but use instead broadband light sources, e.g., in conjunction with wavelength division multiplexing.

Apart from periodic polarization modulation, the dynamic polarization controller may also be used, in accordance with various embodiments, to compensate for (undesired) slow variations in polarization states (act 418). For example, any intrinsic variability in the polarization mode dispersion of the polarization control device itself, e.g., due to temperature fluctuations, may be counteracted by monitoring the temperature of the device and adjusting the compressive force accordingly to keep the phase delay onto light polarized in the direction of that force constant. As another example, the dynamic polarization controller may be used to fully or partially compensate for any polarization mode dispersion introduced by other system components, by adjusting the transverse compressive force exerted by the dynamic polarization controller based on a relative phase delay, introduced externally to the static and dynamic polarization controllers, between light polarized in the directions of the forces exerted by the static and dynamic polarization controllers. Such adjustments may be made once during or immediately preceding an operation, e.g., during an initial system set-up phase, or may be performed repeatedly (in a loop 420), e.g., in response to the detection of a change in a monitored system parameter (such as temperature). Further, force adjustment made by the dynamic polarization controller on long time scales may be used in addition to the (e.g., high-speed) polarization modulation as described above (and as depicted, e.g., in acts 412, 414), but may also be performed separately in situations that do not involve any periodic polarization modulation.

While the disclosed subject matter has been described and explained herein with respect to various example embodiments, these examples are intended as illustrative only and not as limiting. Various modifications, additional combinations of features, and further applications of the described embodiments that do not depart from the scope of the subject matter may occur to those of ordinary skill in the art. Accordingly, the scope of the inventive subject matter is to be determined by the scope of the following claims and all additional claims supported by the present disclosure, and all equivalents of such claims.

What is claimed is:

1. A fiber-optic sensing system comprising:
an optical fiber;
a tunable light source configured to couple light having two orthogonal polarizations into the optical fiber;
a first polarization controller comprising a first pair of plates to compress a first portion of the optical fiber with a constant first transverse compressive force in a first direction to cause a first phase delay on light polarized in the first direction, the first portion located between the first pair of plates;
a second polarization controller comprising a second pair of plates to compress a second portion of the optical fiber with a variable second transverse compressive force in a second direction substantially orthogonal to the first direction to cause a second phase delay on light polarized in the second direction, the second portion of the optical fiber located between the second pair of plates; and
control circuitry to cause a variation of a wavelength of the light coupled into the optical fiber to be temporally coordinated with a variation of the second transverse compressive force,
wherein the second transverse compressive force is varied between minimum and maximum values corresponding to respective minimum and maximum values of the second phase delay, and wherein the first phase delay is between the minimum and maximum values of the second phase delay.

2. The system of claim 1, wherein a difference between the maximum and minimum values of the second phase delay is no more than 180 degrees.

3. The system of claim 1, wherein the first phase delay falls about mid-way between the minimum and maximum values of the second phase delay.

4. The system of claim 1, wherein the control circuitry is to operate the second polarization controller to alternate between two discrete values of the second transverse compressive force.

5. The system of claim 4, wherein the control circuitry is to operate the tunable light source to alternate between wavelength sweeps in sweeping directions of increasing and decreasing wavelength, and to cause the second polarization controller to switch the second transverse compressive force only during transitions between sweeping directions.

6. The system of claim 4, further comprising:
at least one interferometer coupled to the optical fiber, the at least one interferometer including a reference arm and a measurement arm configured to be coupled to one end of an optical sensing fiber, wherein light is backscattered in the optical sensing fiber and coupled back into the measurement arm during operation; and a polarization-diverse optical detector measuring an interference pattern between the backscattered light exiting the measurement arm and light exiting the reference arm, the interference pattern being measured for two polarization states corresponding to the two values of the second transverse compressive force.

7. The system of claim 6, further comprising:

a data processor to process electrical signals resulting from the measured interference pattern for the two polarization states to determine at least one of an orientation, temperature, or strain of the optical sensing fiber as a function of position along the optical sensing fiber.

8. The system of claim 7, wherein the optical sensing fiber comprises a shape-sensing fiber.

9. The system of claim 1, wherein the second transverse compressive force is further adjusted based on a change in temperature of the optical fiber to compensate for an effect of the temperature on the second phase delay.

10. The system of claim 1, wherein the second transverse compressive force is further adjusted based on a relative phase delay between light polarized in the first and second directions to compensate for the relative phase delay, wherein the light polarized in the first and second directions is introduced externally to the first and second polarization controllers.

11. A method comprising:

coupling light having two orthogonal polarizations into an optical fiber;

using a first polarization controller comprising a first pair of plates that compress a first portion of the optical fiber to exert a constant first transverse compressive force on the optical fiber in a first direction to cause a first phase delay on light polarized in the first direction, the first portion located between the first pair of plates; and using a second polarization controller comprising a second pair of plates that compress a second portion of the optical fiber to exert a variable second transverse compressive force on the optical fiber in a second direction substantially perpendicular to the first direction to cause a second phase delay on light polarized in the second direction, the second portion located between the second pair of plates, wherein the first and second transverse compressive forces are such that the first phase delay is between minimum and maximum values of the second phase delay, whereby the first phase delay compensates for a phase delay resulting from an undesired biasing force of the second polarization controller.

12. The method of claim 11, wherein a difference between the maximum and minimum values of the second phase delay is no more than 180 degrees.

13. The method of claim 11 wherein the second transverse compressive force is caused to alternate between two discrete values.

14. The method of claim 13, further comprising:

periodically sweeping a wavelength of the light coupled into the optical fiber alternatingly in sweeping directions of increasing and decreasing wavelength, and switching between the two discrete values only during transitions between the sweeping directions.

15. The method of claim 11, wherein the second transverse compressive force is further adjusted based on a change in temperature of the optical fiber to compensate for an effect of the temperature on the second phase delay.

16. The method of claim 11, wherein the second transverse compressive force is further adjusted based on a relative phase delay between light polarized in the first and second directions to compensate for the relative phase delay, wherein the light polarized in the first and second directions is introduced externally to the first and second polarization controllers.

* * * * *